BENNY AUERBACH, OF NEW YORK, N. Y.

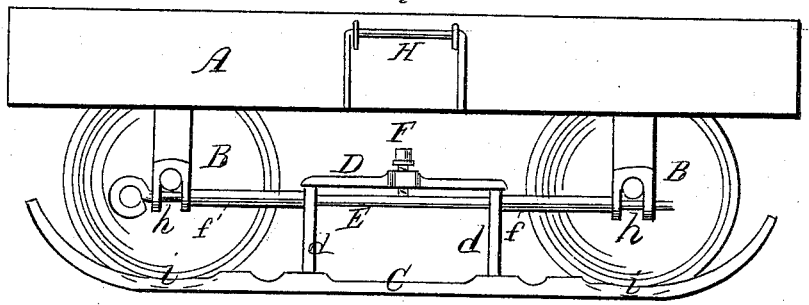
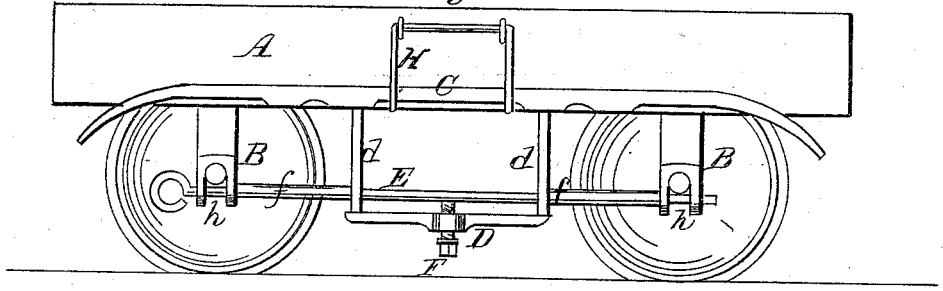
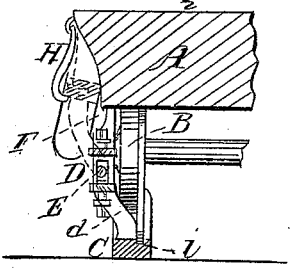

*Letters Patent No. 88,601, dated April 6, 1869.*

IMPROVEMENT IN ATTACHING SLEIGH-RUNNERS TO STREET-CARS.

The Schedule referred to in these Letters Patent and making part of the same.

*To all whom it may concern:*

Be it known that I, BENNY AUERBACH, of the city of New York, a subject of the King of Prussia, have invented a new and useful Improvement in the Application of Sleigh-Runners to Street-Cars, and other wheeled vehicles; and I do hereby declare that the following is a full and exact description thereof, reference being had to the accompanying drawings, in which—

Figure 1 is a side elevation of a car-truck, showing the runner as applied thereto.

Figure 2 is a similar view, with the runner detached and suspended, as when not required for use.

Figure 3 is a vertical section of a portion of the truck-frame or car-body between the wheels, with the runners applied, and the same being shown as removed and suspended in red lines.

Like letters refer to corresponding parts in all of the figures.

It is the special object of my invention, to so construct and apply sleigh-runners to street-cars, that they may be connected with the wheels for use when the track is covered with snow, with great ease and facility, and as readily disconnected when not required, thereby avoiding the necessity of a change of vehicles, or the removal of the car-trucks or wheels, and it is also applicable to other wheeled vehicles for a like purpose.

My improvement consists essentially in applying the runner by means of a hanger-frame, pivoted by sleeves, on a horizontal rod or bearing, lying longitudinal with the plane of the wheels, and near the axis thereof, said frame being made adjustable by means of a set-screw acting upon the rod to hold the runner to the wheels when applied, and allowing the same, when not required for use, to be revolved upward, and suspended above the wheels, and out of the way, and in the construction and arrangement of mechanism, whereby these functions are performed.

In the drawings—

A represents the truck-frame, or car-body;

B B, the wheels; and

C, the runner, which is connected with the two arms $d\ d$ of the hanger-frame D.

E E is the axial rod of the frame, extending from one wheel to the other, and most conveniently attached to the boxes, or brackets $h\ h$, in which the journals of the wheels run.

Extending each way from the arms $d\ d$ of the frame, are sleeves $f f$, through which the rod E E passes, giving an extended bearing thereon, and stiffening it when the runner is to be held to its place, as will presently be described, as well as preventing the frame from being moved in an endwise direction.

The cross-head portion D of the frame, has passing through it, a set-screw, or bolt, F, the end of which, when screwed down, bears upon the axial rod E.

Socket-recesses, fitting the flanges of the wheels, are provided in the upper surface of the runner, at $i\ i$, in which the wheels rest when the runner is placed under them.

The holes through the arms $d\ d$ being oblong, enable the runner to be brought up, and hold it securely to the wheels, when the bolt F is screwed down against the rod E.

When not required under the wheels, the car is lifted sufficiently by a jack, or other means, to remove the weight from the runner, when the bolt F is loosened, and the runner is swung out and revolved around the rod E, to a vertical position above the same, in which position it is secured by the bail H, until again required for service, thus being always at hand, and capable of being applied in a moment of time.

The runner is upwardly curved at each end, so that the car may be drawn in either direction.

To adapt my invention most fully to the purposes of street-cars, I construct a lever having a standard pivoted to it as a fulcrum, with recesses in its short arm, or arms, for the reception of the rod E, by which a single attendant can raise one side of the car sufficiently to apply the runner under the wheels, or remove it therefrom.

This may conveniently be carried with the cars, and dispense with the necessity of a jack, or other means of raising.

When the car has been placed upon the runners, it is indispensable that the draught-pole should be rigid, in order that the team may guide the vehicle, which no longer has a special track of its own, and to effect this, I pivot on each side of the pole-coupling, a pair of braces, which can be connected or disconnected at will.

What I claim as my invention, and desire to secure by Letters Patent, is—

The combination, with the wheels B B of the runners C, hanger-frame D, swivelled on the axial rod E, and adjustable thereto by means of the set-bolt F, arranged and operating substantially as and for the purposes set forth.

Also, in combination with the axial rod E, connecting the boxes of the wheels B B, the sleeves $f f$ of the frame-portions $d\ d$, operating in the manner, and for the purposes shown and described.

In witness whereof, I have hereunto signed my name, in the presence of two subscribing witnesses.

BENNY AUERBACH.

Witnesses:
J. FRASER,
KATE N. JONES.